United States Patent

Allouis et al.

[11] Patent Number: 5,315,595
[45] Date of Patent: May 24, 1994

[54] PACKET MODE METHOD AND CONCENTRATOR ARRANGEMENT FOR DATA TERMINALS SERVED BY AN ISDN

[75] Inventors: Jacques Allouis, Ostwald; Jean-Claude Fuhrer, Fegersheim, both of France

[73] Assignee: Alcatel N.V., Amsterdam, Netherlands

[21] Appl. No.: 848,419

[22] Filed: Mar. 6, 1992

[30] Foreign Application Priority Data

Mar. 8, 1991 [FR] France ................... 91 02819

[51] Int. Cl.⁵ .................. H04J 3/12; H04L 12/56
[52] U.S. Cl. .................. 370/110.1; 370/60
[58] Field of Search ............ 370/110.1, 68.1, 84, 370/94.1, 60, 58.1, 58.2, 62, 79; 379/90, 210, 112, 93–95; 340/825.05, 825.04

[56] References Cited

U.S. PATENT DOCUMENTS

| | | | |
|---|---|---|---|
| 4,788,682 | 11/1988 | Vij et al. | 370/110.1 |
| 4,792,800 | 12/1988 | Fujioka et al. | 340/825.05 |
| 4,882,727 | 11/1989 | Williams et al. | 370/110.1 |
| 4,922,484 | 5/1990 | Yoshida et al. | 370/110.1 |
| 5,067,125 | 11/1991 | Tsuchida | 370/110.1 |
| 5,124,976 | 6/1992 | Lemaistre et al. | 370/110.1 |
| 5,159,594 | 10/1992 | Bales et al. | 370/110.1 |

FOREIGN PATENT DOCUMENTS 0404994  6/1989  European Pat. Off. .

Primary Examiner—Douglas W. Olms
Assistant Examiner—Dang Ton
Attorney, Agent, or Firm—Robbins, Berliner & Carson

[57] ABSTRACT

A concentration method and concentrator arrangement enable a plurality of synchronous or asynchronous data terminals to be served by a common B channel of an ISDN to which the data terminals are connected by a digital subscriber termination and terminal adapters for transmission in packet mode. The terminal adapters are connected to the digital subscriber termination at the S0 basic access level. In the event of a request for B channel communication between a first data terminal served by a first terminal adapter and a packet mode ISDN port to which a second data terminal already has access via a second terminal adapter and via a first B channel, a transit connection is established between the two terminal adapters via the digital subscriber termination using a second B channel. Data packets conveyed between the first data terminal and the ISDN port are conveyed via the terminal adapter of the second data terminal.

11 Claims, 1 Drawing Sheet

PACKET MODE METHOD AND CONCENTRATOR ARRANGEMENT FOR DATA TERMINALS SERVED BY AN ISDN

BACKGROUND OF THE INVENTION

1. Field of the Invention

The invention concerns a method and a concentrator arrangement adapted to enable a plurality of data terminals to be served by the same B channel of an ISDN (Integrated Services Digital Network) to which the terminals are connected via terminal adapters and a digital subscriber termination to transmit data in packet mode.

2. Description of the Prior Art

Provision is made for connecting data terminals to an access point of a packet-switched network such as the TRANSPAC network via an ISDN to which the terminals are connected via appropriate terminal adapters and via a digital subscriber termination to enable transmission of data in packets, the ISDN having to be connected to the packet-switched network at this access point at least.

It is also feasible to interconnect data terminals via an ISDN digital subscriber termination and possibly via this network for the same purposes of transmitting data in packet mode.

In each case the data is transmitted via an ISDN B channel which has a fixed throughput of 64 kbit/s.

A conventional solution to the problem of connecting an asynchronous data terminal to an ISDN digital subscriber termination uses a terminal adapter through which the terminal is connected at an S reference point of the architectural model defined by the CCITT for this type of network, so-called basic access at this level being usually denoted S0.

The digital subscriber termination, for example a PABX, a local area network or a keyphone installation, is usually connected to an ISDN digital network termination at the T reference point or possibly to a line terminal at a U reference point.

The data terminal may be an asynchronous terminal, for example a personal computer which is connected to the terminal adapter by an RS232C type link under operating conditions equivalent to those recommended by CCITT Recommendation V.24 for transmitting data over telephone lines.

The data terminal may instead be a synchronous terminal, for example a powerful computer system which is connected to the terminal adapter under operating conditions defined by CCITT Recommendation X.25 for packet-switched transmission of data over a public data network.

As a packet mode data terminal usually requires a lower throughput than an ISDN B channel, it is beneficial to concentrate the maximum number of logical channels used by data terminals onto a minimum number of physical channels.

This is particularly important in the case of terminals connected to a packet-switched network via an ISDN access point which inevitably has a limited processing capacity, given the very large number of terminals that can be connected.

This approach is also beneficial when it is required to connect a plurality of data terminals to a common other terminal, for example a computer system which itself has direct access to an ISDN S0 level basic access port.

SUMMARY OF THE INVENTION

The present invention proposes a concentration method adapted to enable a plurality of synchronous or asynchronous data terminals to be served by a common B channel of an ISDN to which the terminals are connected via a digital subscriber termination and terminal adapters for transmission of data in packet mode, the data terminals being connected to the terminal adapters by V.24 digital interfaces and the terminal adapters being connected to the digital subscriber termination at the S0 basic access level providing access to two data B channels and one ISDN signalling D channel.

According to one feature of the invention, if B channel communication is requested between a first data terminal served by a first terminal adapter and a packet mode ISDN port to which a second data terminal already has access via a second terminal adapter and a first B channel, a transit connection is established between the two terminal adapters via the digital subscriber termination by means of a second B channel so that data packets transmitted between the first data terminal and the ISDN port in question pass through the terminal adapter of the second terminal and through the first B channel by which the second terminal adapter communicates with this ISDN port, and likewise in respect of packets relating to the second data terminal.

The invention also proposes a concentrator arrangement implementing the method explained hereinabove and consequently adapted to enable a plurality of synchronous or asynchronous data terminals to be served by a common B channel of an ISDN to which the data terminals are connected via terminal adapters and a digital subscriber termination for transmission of data in packet mode, the data terminals being connected to the terminal adapters via V.24 digital interfaces and the terminal adapters being connected to the digital subscriber termination at the S0 basic access level to obtain access to ISDN signalling via the digital subscriber termination.

According to one feature of the invention, this arrangement comprises means for establishing a transit connection via a B channel of a first terminal adapter serving a first data terminal and via the digital subscriber termination to a second terminal adapter serving a second terminal already connected via another B channel to a packet mode ISDN port to which the first terminal is to be connected so that data packets conveyed in one direction between the first data terminal and the ISDN port data in question pass through the terminal adapter of the second terminal and through the B channel by which the second terminal adapter communicates with this ISDN port, packets conveyed in the same direction for both data terminals being therefore conveyed by the same B channel between the second terminal adapter and the ISDN port.

The invention, its features and its advantages are explained in the following description given with reference to the figures listed below of the appended drawings.

DETAILED DESCRIPTION OF THE INVENTION

Figure 1:
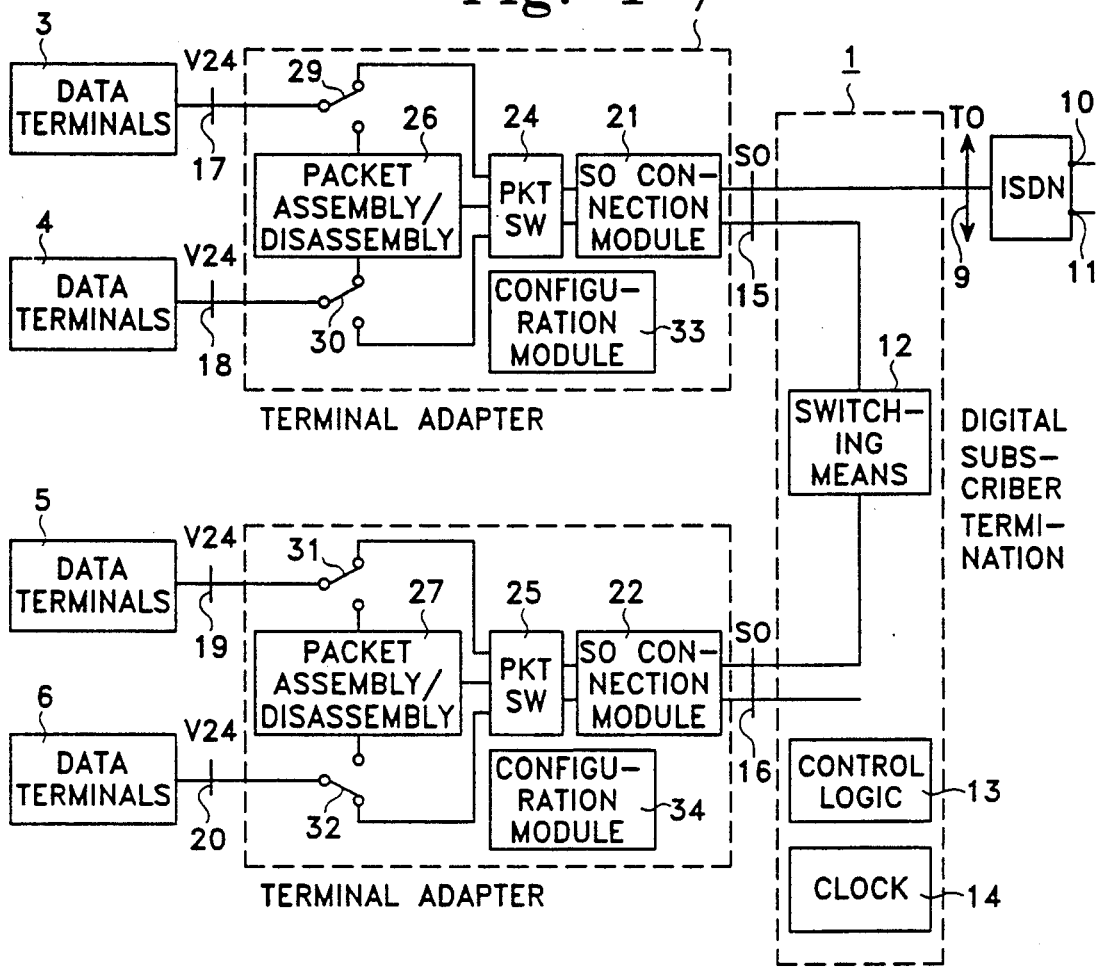
FIG. 1 shows a block diagram of a concentrator arrangement in accordance with the invention for a digital subscriber termination connected to an ISDN port.

The method and the concentrator arrangement in accordance with the invention are adapted to be used at the level of a digital subscriber termination 1 connected to an integrated services digital network (ISDN) 2 via at least one port, this termination serving a plurality of data terminals 3, 4, 5 and 6 requiring use of terminal adapters 7 and 8 to access the ISDN at the level of the digital subscriber termination 1.

As previously mentioned, the latter is usually connected to the network 2 via at least one T0 basic access port 9 (ISDN architecture T reference level) to communicate with remote terminals connected to the network 2 via other ports 10, 11.

The digital subscriber termination 1 is a digital PABX, for example. As explained hereinabove, it comprises switching means 12 which are usually supervised by control logic 13 associated with a synchronization clock 14.

The switching means 12 enable interconnection at will of various ports of the digital subscriber termination which may represent various ISDN interface levels, in particular the T reference level as mentioned above with respect to the port 9 and the S reference level as mentioned for the ports 15 and 16 which are here assumed to be S0 basic access ports.

The terminal adapters connected to the digital subscriber termination 1 are assumed to be each connectable to an S0 level basic access port so that each has the facility to transmit over two 64 kbit/s B data channels and one 16 kbit/s signalling D channel via the digital subscriber termination 1 and the network 2 to which it is connected.

The same terminal adapters 7, 8 are also adapted each to be connected to at least one (in this example two) data terminals, for example via individual RS232C type links, in other words through V.24 type functional interfaces 17, 18, 19 and 20.

In this example, each terminal adapter 7, 8 comprises an S0 level basic access port connection module 21, 22 which is connected to a packet switch 24, 25 enabling the switching of packets transmitted between the data terminal (or, as here, the two data terminals) connected to the terminal adapter in question and the digital subscriber termination 1 via the respective port 15 or 16 to which the terminal adapter is connected.

Each packet switch 24 or 25 is a buffer memory providing access for a data terminal connected to the terminal adapter of which it forms part to one or other of the B and D channels of the terminal adapter via the connecting module 21 or 22 to an S0 basic access port which it comprises.

According to the invention each packet switch 24 or 25 can also transmit packets from a B channel of the respective basic access port 15 or 16 to the other B channel of this port.

In the embodiment shown an assembler/disassembler module 26, 27 enables, if required, assembly into packets of the data supplied by an asynchronous data terminal (the terminal 4, for example) and disassembly of data packets addressed to it.

Routing devices 29, 30 or 31, 32 connect each synchronous data terminal (3, 5 or 6 in this example) directly to the packet switch 24 or 25 of the terminal adapter to which it is connected or each asynchronous terminal (terminal 4 in this example) to the same packet switch via the respective assembler-disassembler module 26, 27.

A configuration module 33, 34 implemented in hardware and/or software enables the user to adapt to his requirements the terminal adapter that incorporates this module and in particular to set the routing units.

According to the invention, the configuration module of a terminal adapter (the terminal adapter 7, for example) is further adapted to control, by means of instructions, the use of another terminal adapter (the terminal adapter 8, for example) firstly if at least one of the data terminals (the data terminal 3, for example) connected to it initiates a call procedure to transmit packets to a terminal served by a port (the port 10, for example) of the ISDN to which is connected the digital subscriber termination 1 to which it is itself connected and secondly if the port 10 is potentially or already connected by a B channel to this other terminal adapter 8 on behalf of one of the data terminals 5, 6 served by the terminal adapter 8.

Figure 2:
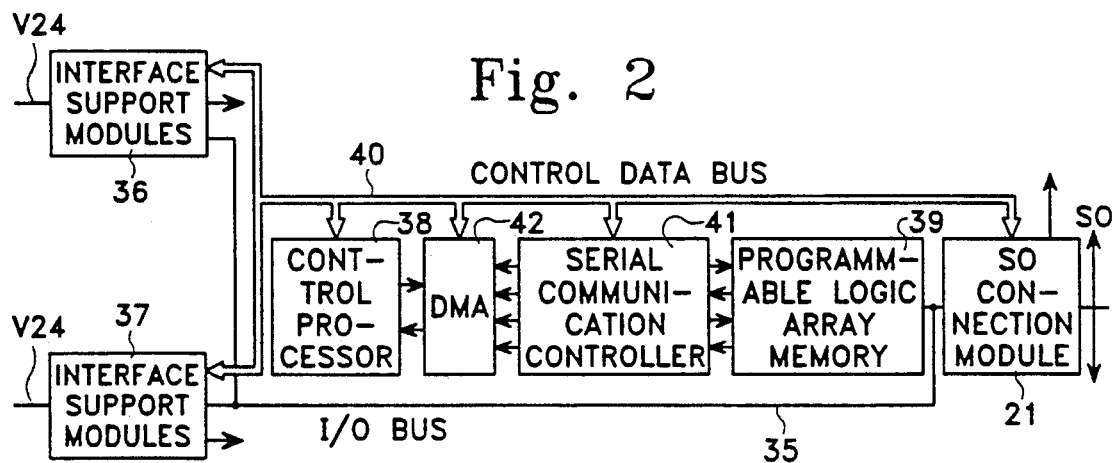
FIG. 2 shows a block diagram of a terminal adapter for use in a concentrator arrangement in accordance with the invention.

One embodiment of terminal adapter 7, 8 is proposed in FIG. 2. It comprises a connection module 21, 22 which is a SIEMENS AKTIENGESELLSCHAFT PEB 2085 device, for example, for managing levels 1 and 2 of the conventional LAP D link access protocol and for transferring data between the B channels of the S0 level basic access port concerned and those of an input-output bus 35 of the terminal adapter.

This terminal adapter further comprises at least one (in this example two) V.24 interface support modules 36, 37 for connecting each data terminal connected directly to this terminal adapter, each module being a SIEMENS AKTIENGESELLSCHAFT PSB 2110 device, for example.

The module 36, 37 sets up and clears down calls and establishes a direct interrupt serviced link between the terminal that it serves and a control processor 38 included in the terminal adapter via a bus 40 assigned to this processor for transmitting control and data messages when it is in control mode.

It also inserts data into and extracts data from the B channels in conjunction with a programmable logic array memory 39 to which it is connected by the bus 20 and sends data to the processor 38 in interrupt serviced mode.

A serial communication controller 41 manages the packet mode data frames. It has two HDLC links for this purpose and is connected to the memory 39 and to a direct memory access circuit 42 providing direct access to the scratchpad memory of the processor 38 to transfer data between this scratchpad memory and the controller.

As mentioned above, if packet mode communication on a B channel is requested by a first data terminal (data terminal 3, for example) to a terminal served by a packet mode ISDN port (port 10, for example) the processor 38 of the terminal adapter 7 to which the terminal 3 is connected checks if it has in memory configuration instructions for setting up the necessary link to this port either directly or via another terminal adapter (the terminal adapter 8, for example) in such a way as to share with the latter the B channel that the latter is using itself.

In this latter case the terminal adapter 7 must usually be connected by the digital subscriber termination 1 to the terminal adapter 8 via one of the two B channels available to it.

After communication is established between them, the appropriately configured terminal adapter 8 switches packets which it receives from the terminal adapter 7 via another B channel of this basic access port via its switch 25 and sends them to the requested port 10 via a B channel of its basic access port 16. The B channel connecting the terminal adapter 8 to the port 10 via the digital subscriber termination 1 and possibly another part of the network 2 is therefore able to send packets from at least two different terminals to the same port 8 either once these terminals are connected to the same terminal adapter as is possible with the terminal adapters 7 and 8 shown here or because they are connected to terminal adapters which are interconnected in such a way that one can call the next using the procedure described for the terminal adapter 7 to call the terminal adapter 8.

This caters for a low-cost connection between low throughput consultation terminals and a common database processor, for example, by limiting the number of B channels required at the database processor access level, the consultation terminals being then grouped together in clusters assigned different B channels.

Of course, the method and the concentrator arrangement can also be used if the packet mode port to which a plurality of terminals are likely to require simultaneous access is a port of the digital subscriber termination 1 itself.

We claim:

1. Concentration method adapted to enable a plurality of synchronous or asynchronous data terminals to be served by a common ISDN data B channel to which said terminals are connected via a digital subscriber termination and terminal adapters for transmission of data in packet mode, said data terminals being connected to said terminal adapters via digital interfaces and said terminal adapters being connected to said digital subscriber termination at a basic access level providing access to first and second ISDN data B channels and to an ISDN signalling D channel, comprising the steps for providing B channel communication between a first data terminal served by a first terminal adapter and a packet mode ISDN port to which a second data terminal already has access via a second terminal adapter and the first B channel:

establishing a transit connection between said first and second terminal adapters via said digital subscriber termination and the second B channel, passing data packets to be transmitted between the first data terminal and said packet mode ISDN port via said transit connection, the second terminal adapter and the first B channel, and passing data packets to be transmitted between the second data terminal and said packet mode ISDN port also via the second terminal adapter and the first B channel.

2. Concentrator arrangement adapted to enable a plurality of synchronous or asynchronous data terminals to be served by a common ISDN data B channel to which said data terminals are connected via terminal adapters and a digital subscriber termination for transmission of data in packet mode, said data terminals being connected to said terminal adapters via digital interfaces and said terminal adapters being connected to said digital subscriber termination to obtain access to first and second ISDN data B channels and an ISDN signalling D channel via said digital subscriber termination, said arrangement comprising:

means for establishing a transit connection between said first and second terminal adapters via said digital subscriber termination and the second ISDN data B channel, means for passing data packets to be transmitted in a first direction between the first data terminal and a common packet mode ISDN port via said transit connection, the second terminal adapter and the first ISDN data B channel, and means or passing data packets to be transmitted in said first direction between the second data terminal and said common packet mode ISDN port also via the second terminal adapter and the first ISDN data B channel, whereby data packets conveyed in said first direction between the first data terminal and said common ISDN port pass through said second terminal adapter of said second data terminal and through the first ISDN data B channel by which said second terminal adapter communicates with said ISDN port, and whereby packets conveyed in the same direction for both data terminals are conveyed by the ISDN first data B channel between said second terminal adapter and said common ISDN port, said ISDN first data B channel thereby functioning as said ISDN common data B channel.

3. Concentrator arrangement according to claim 2 wherein at least said second terminal adapter comprises switching means for enabling the transmission of packets from said second ISDN data B channel to said first ISDN data B channel to thereby enable a second transit connection to be established through the second terminal adapter to said common packet mode ISDN port to which said second terminal adapter is connected.

4. Concentrator arrangement according to claim 3 wherein said transit connection establishing means is incorporated in a configuration module of said first terminal and provides instructions to a control logic of said digital subscriber termination, whereby said first terminal adapter calls said second terminal adapter to set up a B channel connection between said first and second terminal adapters via said digital subscriber termination if the packet mode ISDN port to which said second terminal adapter has access is called by a data terminal connected to said first terminal adapter.

5. Concentrator arrangement according to claim 4 wherein a plurality of said terminal adapters are interconnected by incorporation of appropriate call instructions in their respective configuration modules for transmission of data packets between respective data terminals each connected to one of said interconnected terminal adapters and to said common packet mode ISDN port via said common shared ISDN data B channel.

6. Concentration method according to claim 1 wherein said digital interfaces conform to CCITT standard V.24.

7. Concentration method according to claim 1 wherein said basic access level is an S0 access level of an ISDN.

8. Concentration method according to claim 1 wherein said first ISDN data B channel is said common ISDN data B channel.

9. Concentrator arrangement according to claim 2 wherein said digital interfaces conform to CCITT standard V.24.

10. Concentrator arrangement according to claim 2 wherein said basic access level is an SO access level of an ISDN.

11. Concentrator arrangement according to claim 2 wherein said first ISDN data B channel is said common ISDN data B channel.

* * * * *